United States Patent [19]

Esselborn et al.

[11] Patent Number: 5,693,848
[45] Date of Patent: Dec. 2, 1997

[54] α, ω-POLYMETHACRYLATE DICARBOXYLIC ACIDS, THEIR SYNTHESIS AND USE AS DICARBOXYLIC ACID COMPONENTS FOR THE SYNTHESIS OR MODIFICATION OF POLYESTERS, POLYURETHANES OR POLYEPOXIDES

[75] Inventors: Eberhard Esselborn, Essen; Jürgen Fock, Düsseldorf, both of Germany

[73] Assignee: Th. Goldschmidt AG, Essen, Germany

[21] Appl. No.: 544,507

[22] Filed: Oct. 18, 1995

[30] Foreign Application Priority Data

Oct. 21, 1994 [DE] Germany .............. 44 37 673.1

[51] Int. Cl.[6] .................................. C07C 321/00
[52] U.S. Cl. ............ 560/154; 560/15; 252/182.17; 252/182.3
[58] Field of Search ............ 560/15, 154; 252/182.17, 252/182.3

[56] References Cited

U.S. PATENT DOCUMENTS

| | | | |
|---|---|---|---|
| 4,593,081 | 6/1986 | Bobsein et al. | 526/211 |
| 4,956,433 | 9/1990 | Mezger | 526/265 |
| 5,071,895 | 12/1991 | Hughes et al. | 526/210 |
| 5,254,632 | 10/1993 | Kerscher | 525/309 |

OTHER PUBLICATIONS

Mark H.; and Overberger, C.G. (Board of Editors), Hermans, J.J.; Melville, H.W. and Smets G.(Advisory Editors); Overberger, C.G. (Editor), Peace, E.; Casassa, E.F.; and Markovitz, H.(Associate Editors), Telechelic Polymers by Group Transfer Polymerization, Journal of Polymer Science, Polymer Letters Edition, Interscience® Publication published by John Wiley & Sons, 21, 927–931 (1983).

Nair, C.P.R.; Clouet, G.; and Chaumont, P., Functionalization of PMMA by a Functional "Iniferter": Kinetics of Polymerization of MMA Using N,N'—Diethyl–N, N'-Bis(2-Hydroxyethyl)thiuram Disulfife, Journal of Polymer Science Part A: Polymer Chemistry, 27, 1795–1809 (1989).

Büchel, K.H.; Falbe, J.; Hagemann, H.; Hanack, M.; Klamann, D.; Kreher, R.; Kropf, H.; Regitz, M.; and Schaumann, E., Makromolekulare Stoffe, Houben–Weyl, Methoden der organischen Chemie, George Thieme Verlag Stuttgart (New York), Band E 20/Teil 1, 158–159, 1987.

Dr. Batzer, H.; Dr. Lohse, F.; Epoxidverbindungen, Ullmanns Encyklopädie technischen Chemie, Dentalchemie bis Erdölverarbeitung, Verlag Chemie, Weinheim/Bergstr., Band 10, 563–580, 1975.

Primary Examiner—Saumel Barts
Attorney, Agent, or Firm—Anderson Kill & Olick, P.C.

[57] ABSTRACT

α,ω-polymethacrylate dicarboxylic acids of the general formula

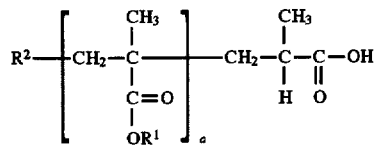

wherein $R^1$ is an optionally halogenated alkyl group with 1 to 22 carbon atoms, wherein the R1 group can assume different meanings in the polymer molecule, $R^2$ is the group of a known chain transfer agent, which has a terminal —COOH croup and a has a value not less than 4. The invention furthermore relates to the synthesis of these compounds and their use as sole or partial components for the synthesis or modification of polyepoxides, polyesters, polyamides, alkyd resins or polyurethanes.

3 Claims, No Drawings

α, ω-POLYMETHACRYLATE DICARBOXYLIC ACIDS, THEIR SYNTHESIS AND USE AS DICARBOXYLIC ACID COMPONENTS FOR THE SYNTHESIS OR MODIFICATION OF POLYESTERS, POLYURETHANES OR POLYEPOXIDES

FIELD OF THE INVENTION

The invention relates to α,ω-polymethacrylate dicarboxylic acids which, by virtue of having terminal carboxyl groups, are reactive components for the preparation of synthetic resins of the ABA or $(AB)_m A$ type, m being a whole number greater than or equal to 1.

The invention furthermore relates to the synthesis of these α,ω-polymethacrylate dicarboxylic acids.

Finally, the invention relates to α,ω-polymethacrylate dicarboxylic acids as sole or partial components for the synthesis or modification of polyepoxides, polyesters, polyamides, polyurethanes or alkyd resins.

BACKGROUND INFORMATION AND PRIOR ART

The synthesis of polymethacrylates with terminal, functional groups has been attempted in various ways in recent years. There is a special need for such compounds, since polymethacrylates with terminal functional groups are particularly suitable for the synthesis of block copolymers, because the polymethacrylates with functional terminal groups can be reacted with polymers having functional terminal groups and different structure. For example, polymethacrylates with terminal, functional carboxylic acids, can be reacted with polymers, which have terminal hydroxyl groups. The properties and structure of Polyesters thus obtained can be influenced by the choice of the polymethacrylate and the glycol, as well as by the ratio of the reactants.

In particular, attempts have been made to obtain polymethacrylates, such as polymethacrylate glycols, by a group-transfer polymerization. However, an extremely high purity of the reagents used and the careful exclusion of moisture from the air are prerequisites for carrying out a group transfer polymerization. By utilizing initiators with protected functional groups (See, Houben-Weyl, Methoden der organischen Chemie (Methods of Organic Chemistry), vol. E 20/Part 1, Table 18, pages 158 ff.), synthesized at great expense, only monofunctional polymers are obtained, which have a narrow molecular weight distribution. The synthesis of α,ωdifunctional polymers has not been possible or been possible only at great expense in an incomplete manner by this procedure, which until now has been the only means of obtaining these polymers (D. Y. Sogah and O. W. Webster, J. Polym. Sci., Polym. Lett. Ed. 21, 927 (1983)).

A further method for synthesizing α,ω-terminated polymethacrylates, using thiuram disulfides and the so-called "Iniferter" technique (initiator, transfer agent, terminator), was developed recently. Admittedly, the products obtained have a functionality which comes close to the desired functionality of 2. However, because they are very sensitive to hydrolytic, thermal and oxidative effects, their possible use is only limited. (C. P. Reghunadham et al., J. Polym. Sci., Part A: Pol. Chem. 27, 1795, (1989)).

Surprisingly, the present invention led to a procedure which solves in a simple way the technical problem of synthesizing α,ω-polymethacrylate dicarboxylic acids, these dicarboxylic acids being essentially free of compounds having a functionality of smaller or larger than 2.

OBJECT OF THE INVENTION

An object of the present invention is α,ω-polymethacrylate dicarboxylic acids. Another object of the present invention is a method of synthesizing such dicarboxylic acids. Yet another object of the invention is a component for synthesizing or modifying a polyepoxide, polyester, polyamide, alkyd resin or a polyurethane wherein the component comprises the inventive dicarboxylic acid.

The inventive α,ω-polymethacrylate dicarboxylic acids of the general formula

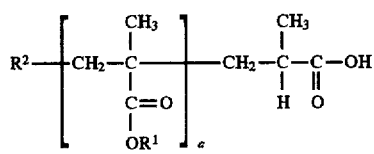

wherein $R^1$ is an optionally halogenated alkyl group with 1 to 22 carbon atoms, wherein the $R^1$ group can assume different meanings in the polymer molecule, $R^2$ is the group of a known chain transfer agent, which has a terminal —COOH group and a has a value not less than 4.

$R^1$ is an alkyl group, which is derived from the alcohol $R^1$OH and with which the monomeric methacrylic acid has been esterified before the polymerization. Since monomeric methacrylate esters with different ester components can be used for the synthesis of the polymer, the $R^1$ group can assume different meanings in the polymer molecule. Preferably, the $R^1$ group is an alkyl group with 1 to 8 carbon atoms, such as the methyl, ethyl, propyl, butyl or octyl group. Optionally, the alkyl groups may be branched and/or halogenated. The properties of the inventive α,ω-polymethacrylate dicarboxylic acids can be changed in a desirable and selective manner by choosing a different $R^1$ group. For example, it is possible to increase the compatibility with nonpolar compounds by selecting $R^1$ groups with a higher number of carbon atoms. However, $R^1$ groups exclusively with 22 carbon atoms are utilized infrequently. It is, however, possible to provide inventive compounds, in which, for example, 90% of the $R^1$ groups are alkyl groups with 1 to 4 carbon atoms and 10% of the $R^1$ groups are alkyl groups with, for example, 18 to 22 carbon atoms.

$R^2$ is the group of a known chain transfer agent, which has a terminal —COOH group. In this connection, it is particularly preferred if the $R^2$ group is a group of the general formula —S—$R^3$COOH, wherein $R^3$ is an optionally branched, divalent alkylene group with 1 to 8 carbon atoms or (II) a group of the general formula

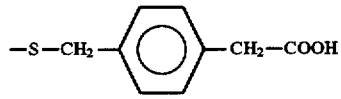

Examples of $R^2$ groups having the meaning given in (I) are:

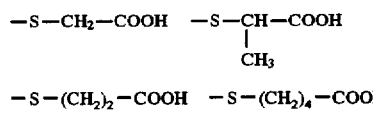

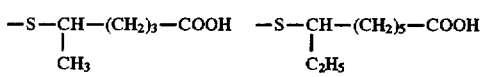

Subscript "a" has a value of not less than 4. Preferably, "a" has a value of 4 to 100 and particularly a value of 4 to 20.

Examples of the inventive α,ω-polymethacrylate dicarboxylic acids are

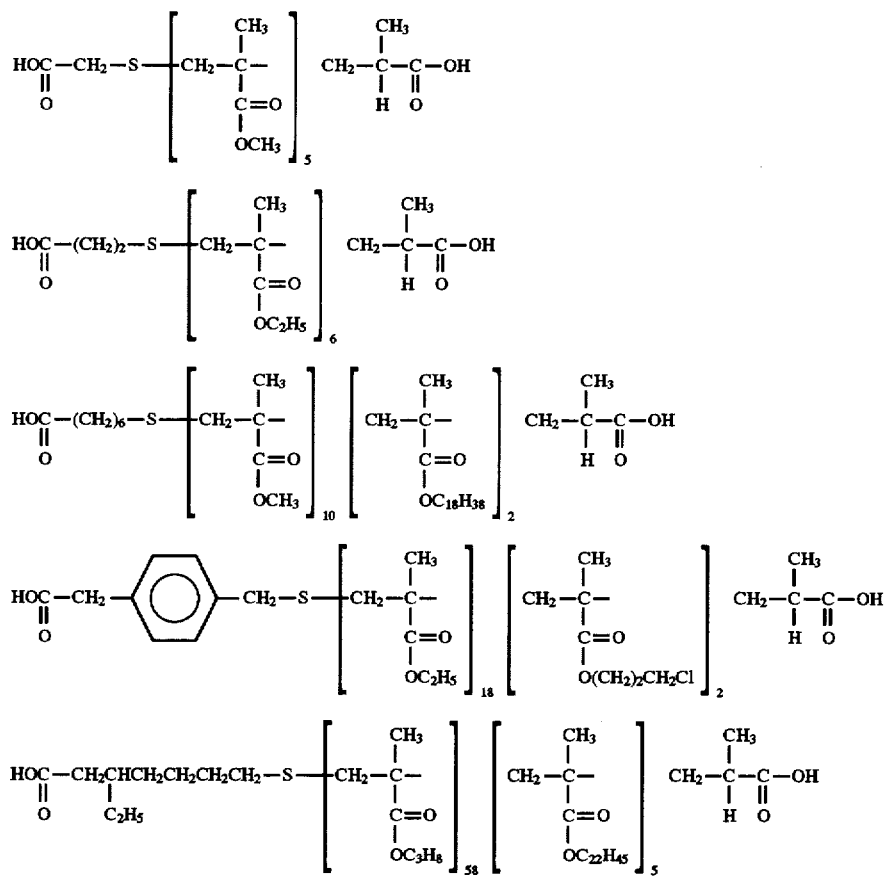

A further object of the invention is the synthesis of the inventive α,ω-polymethacrylate dicarboxylic acids. The inventive method is characterized in that methacrylate esters of the general formula

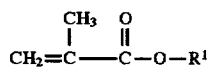

are polymerized by free radical polymerization in the presence of chain transfer agents, which have a terminal —COOR$^4$ group, wherein R$^4$ is hydrogen or an alkyl group with 1 to 4 carbon atoms and the polymer obtained of the simplified general formula

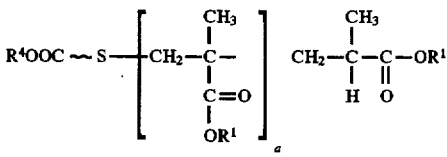

is saponified under mild conditions, based on R$^4$=alkyl and R$^1$=alkyl, in each case with 1-molar to 2-molar amounts of alkali hydroxide and converted by neutralization with acid into the desired α,ω-polymethacrylate dicarboxylic acids. However, the saponification can also be carried out with an inorganic or organic acid, in which case the α,ω-polymethacrylate dicarboxylic acids are obtained directly.

The free radical polymerization of the monomeric methacrylic esters of the formula

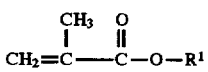

is carried out in a known manner; this means that the reaction generally is conducted in the presence of a suitable solvent, such as toluene. The solvent advisably is degassed using pure nitrogen and heated to the reaction temperature. The reaction temperature is about 100° C. The monomeric methacrylate ester, the chain transfer agent and a suitable initiator, such as azodiisobutyric dinitrile, are now added over a period of about 2 to 5 hours. After a further 1 to 2 hours at this temperature, the polymerization reaction is ended and the product is freed from solvent. In general, the polymeric substances are highly viscous, transparent and slightly yellowish liquids.

The chain transfer agent used has the formula $R^2$-H. It is, however, possible that the carboxyl group of the chain transfer agent is present in an esterified form. The chain transfer agent then has the simplified formula

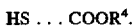

The symbol . . . is either the $R^3$ group or

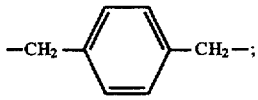

whereas $R^4$ group can also be hydrogen or an alkyl group with 1 to 4 carbon atoms.

As an intermediate, a polymer of the simplified, general formula

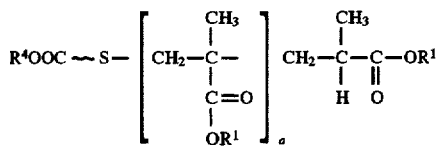

is obtained. This intermediate is now saponified under mild conditions with alkali hydroxide or with an inorganic or organic acid. Assuming that the $R^4$ group is an alkyl group with 1 to 4 carbon atoms, in each case a molar or 2-molar amount is used, based on the $R^1$ and $R^4$ groups. Under these conditions, the ester groups within the polymethacrylate chain are retained.

The concept of saponification under mild conditions is understood to mean saponification, which is carried out at a temperature between 80° and 100° C. at a pressure from normal to 5 bar. As alkali hydroxide, particularly sodium hydroxide is suitable.

The polymers are now present in the form in which there are COO⁻ alkali ions salts in the α,ω position and are optionally neutralized. By reaction with a stronger acid, such as a mineral acid, particularly phosphoric acid or hydrochloric acid, the desired α,ω-polymethacrylate dicarboxylic acids of the invention are obtained directly. The salt formed after neutralization can be removed by dissolving the polymer in a suitable solvent, in which the salt is not soluble.

A further object of the present invention is the use of the inventive α,ω-polymethacrylate dicarboxylic acids as reactive polymers for reaction with other reactive polymers of different functionality, the reactive groups of which are capable of reacting with the carboxyl groups of the inventive compounds. Preferably, monofunctional or difunctional polymeric compounds are used as reaction components, so that block copolymers of the formula ABA or $(AB)_mA$ are obtained.

Examples of the use of the inventive compounds are:
1. Reaction of the α,ω-polymethacrylate dicarboxylic acid with diepoxides or polyexpoxides.
2. Reaction of the α,ω-polymethacrylate dicarboxylic acid with alkylene glycols or polyoxyalkylene glycols for the preparation of polyesters.
3. Reaction of the α,ω-polymethacrylate dicarboxylic acid with alkylene diamines to form polyamides.
4. Reaction with alkyd resins.
5. Reaction with polyurethanes.
6. Reaction with diisocyanates.

The aforementioned reactions are to be taken only as general reaction outlines, because it is possible to use the inventive compounds as sole reaction components or as partial reaction components in addition to other dicarboxylic acids. It is, for example, possible to replace a portion of the dicarboxylic acids, usually used for the preparation of polyesters, with inventive α,ω-polymethacrylate dicarboxylic acids and to modify the properties of the final products by varying the proportion of the inventive α,ω-polymethacrylate dicarboxylic acids in the total amount of dicarboxylic acids.

In principle, the epoxide resins, known to those skilled in the art, can be used as epoxide resins. Particularly preferred are epoxide resins based on the reaction products of bisphenol A or F and epichlorohydrin. Further examples of epoxide resins are the diglycidyl and polyglycidyl ethers of multihydric aliphatic alcohols, such as 1,4-butylene glycol or polyalkylene glycols, such as propylene glycols, diglycidyl or polyglycidyl ethers of cycloaliphatic polyols, such as 2,2-bis(p-hydroxycyclohexyl)-propane, diglycidyl or polyglycidyl ethers of multihydric phenols, such as resorcinol, 2,2-bis-(4'-hydroxy-3',5'-dibromophenyl)-propane, or of condensation products of phenols and formaldehyde obtained under acidic conditions, such as phenol novolaks and cresol novolaks, polyglycidyl esters of multibasic carboxylic acids, such as phthalic acid, terephthalic acid, tetrahydrophthalic acid and hexahydrophthalic acid, N-glycidyl derivatives of amines, amides and heterocyclic nitrogen bases such as
N,N-diglycidylaniline,
N,N-diglycidyltoluidine,
N,N,N'N'-tetraglycidyl-bis-(p-aminophenyl)-methane triglycidyl isocyanurate,
N,N'-diglycidylethylene urea,
N,N'-diglycidyl-5,5-dimethyl-hydantoin,
N,N'-diglycidyl-5,5-dimethyl-6-isopropyl-5,6-dihydrouracil,
and other epoxide resins, such as those described, for example, in H. Jahn "Epoxide Resins" (Epoxide Resins), VEB Deutscher Verlag für Grundstoffindustrie, Leipzig, 1969, or in H. Batzer and F. Lohse "Ullmanns Enzyklop ädie der technischen Chemie" (Ullmanns Encyclopedia of Technical Chemistry), vol. 10, pages 563 ff., 4th edition, Verlag Chemie, Weinheim, 1975.

The epoxide resins can be modified in various ways. For example, it is possible to add the planned amount of modifier to the total amount of the epoxide resin. Even if the reaction between the carboxyl groups of the modifier and the epoxide groups of the epoxide resin sets in readily at room temperature, it is nevertheless preferred to heat the mixture to temperatures of 100° to 150° C. The reaction then proceeds within 30 minutes to 4 hours. The planned amount of modifier can, however, also be added to only a portion of the total amount of the epoxide resin. In so doing, however, care must be taken that this modified portion of the epoxide resin still has sufficient epoxide groups that, on mixing this amount with the rest of the epoxide resin and the subsequent curing, a reactive incorporation of this modified portion is ensured. It suffices if the modified portion still has about 40 mole percent of the epoxide groups originally present. The advantage of this procedure consists therein that the modification can be carried out already by the manufacturer. It is furthermore possible to carry out the partial modification with an epoxide resin, the composition of which differs from that of the remainder of the epoxide resin. In particular, the partial modification can be carried out with an epoxide resin of low viscosity. The diglycidyl ethers of aliphatic glycols, such as 1,4-butylene glycol, 1,6-hexylene glycol or the neopentenyl glycol are particularly suitable for this purpose.

It may be advantageous to add an effective amount of a catalyst, which accelerates the modification reaction, to the mixture of epoxide resin and modifier. Quaternary ammonium or phosphonium compounds, such as tetramethylammonium chloride or iodide, benzyltrimethylammonium chloride, tetrabutylphosphonium chloride or acetate are particularly suitable as catalysts.

The curing agents, known from the art, can be used to cure the modified epoxide resins. The following curing agents are particularly useful for hot curing, that is, for curing at temperatures above 130° C. to about 220° C.: dicyandiamide and its derivatives, polycarboxylic acid anhydrides, such as phthalic anhydride, methylhexahydrophthalic anhydride, pyromellitic dianhydride. Aromatic polyamines, such as m-phenylenediamine, and cycloaliphatic polyamines are suitable for hot curing at temperatures of about 100° C. Curing at room temperature can be carried out with polyaminoamides, polyaminoimidazolines, modified aliphatic polyamines or polyether polyamines. In particular, the polyaminoamides and polyaminoimidazolines are suitable for curing at room temperature. Particularly high increases in strength values are obtained when they and the inventive modifiers are used.

The respective curing temperature and/or the curing time can be decreased by using known accelerators. Such accelerators are, for example, tertiary amines.

The inventively modified epoxide resins are particularly suitable as adhesives, since they adhere well to the interfaces that are to be bonded and form an elastic, adhesive joint. It is, however, also possible to impregnate supporting webs, such as fiberglass nonwovens or fabrics, with the modified, but not yet cured epoxide resins and to cure them to form laminated fabrics. They can be used, for example, in the electrical industry for producing printed circuits. A further possibility of using these so-called prepegs is the preparation of molded articles, such as in boat construction, as well as for repair purposes, such as in car body construction. Moreover, the modified epoxide resins can be used advantageously as raw materials for lacquers or as casting resins.

In the following examples, initially the synthesis of the inventive α,ω-polymethacrylate dicarboxylic acids is shown. In a further series of examples, the inventive use of these compounds as sole or partial components for the synthesis or modification of epoxide resins is described in greater detail. It is understood that all these examples are provided by way of illustration and not by way of limitation.

EXAMPLES

Synthesis of an α,ω-Polymethacrylate Dicarboxylic Acid a) Synthesis of a Monomethyl Polymethyl Methacrylate, the Molecular Weight of which is Controlled with Methyl Mercaptoacetate In the first step of the synthesis, a monomethyl ω-polymethyl methacrylate is synthesized. For this purpose, 100 g of xylene are added to a reactor under pure nitrogen and heated to 100° C. To this solution, a solution of 894 g (approximately 8.9 moles) of methyl methacrylate, 106 g (approximately 1 mole) of methyl mercaptoacetate and 3 g of azodiisobutyrodinitrile, dissolved in 100 g of xylene, is added at a constant rate over a period of 180 minutes. Heating is continued for 60 minutes at 100° C., after which the reaction is ended.

The resulting product is subsequently freed from solvent, residual monomers and unreacted chain transfer agents by distillation at 150° C. and 1 torr; a highly viscous, transparent and slightly yellowish liquid remains behind. To improve the handling, the product is diluted with methanol to an 80% solution.

Gel chromatographic analysis reveals that the precursor obtained has a number average molecular weight $M_{nGPC(P)}$ of 1,070 and a weight average molecular weight $M_{wGPC(P)}$ of 2030; the non-uniformity coefficient $M_w/M_{n(P)}$ accordingly is 1.9. The molecular weight determined by vapor pressure osmometry $M_{nOsm(P)}$ is 1060 and the residual monomer content is less than 0.1%.

b) Synthesis of the α,ω-Polymethacrylate Dicarboxylic Acid by Selective End-Group Saponification The product of Example 1 a (97.4 g, approximately 0.1 mole), dissolved in 24.4 g of methanol, is reacted over a period of 2 hours at 60° C. with 42 g (0.21 moles) of a 20% sodium hydroxide solution in a reactor under pure nitrogen. The reaction is ended when the alkali number reaches a value of at most 0.5; this is usually the case after 2 hours.

Subsequently, to convert the alkali salt into the free acid, 57.1 g (0.175 moles) of 30% phosphoric acid is added. By removing all volatile components by distillation at 120° C. and 1 torr, sodium phosphate or hydrogen phosphate crystallizes out and, after addition of 60 g of toluene and filtering off the filter aid, a clear solution is obtained.

Gel chromatographic analysis reveals that the polymer obtained has a number average molecular weight $M_{nGPC}$ of 990 and a weight average molecular weight $M_{wGPC}$ of 1880; assuming a functionality of 2, the non-uniformity coefficient $M_{wGPC}/M_{nGPC}$ accordingly is 1.9. The $M_{nOsm}$ determined by vapor pressure osmometry, is 990. Assuming a functionality of 2, a molecular weight of $M_{nAN}$ of 960 is obtained from the acid number. The functionality, determined from the acid number and the $M_{nOsm}$, is 2.06. With the help of MALDI analysis (Matrix Assisted Laser Desorption Ionization Spectroscopy), a method for determining the absolute molecular weights, a homologous series can be recognized, the position of which, taking into consideration the alkali ions in the system, corresponds precisely to the calculated, difunctional polymethacrylate.

Examples 2 to 6

Synthesis of α,ω-Poly-n-Butyl and -2-Ethylhexyl Methacrylate Dicarboxylic Acids of Different Molecular Weights Basically, the method of Example 1 is followed with the difference that, instead of methyl methacrylate, n-butyl methacrylate or 2-ethylhexyl methacrylate is used in different amounts and, as is evident from Table 1, the amounts of chain transfer agent, initiator and xylene are varied.

Table 1 furthermore contains the number average and weight average molecular weights $M_{nGPC(P)}$ and $M_{wGPC(P)}$ respectively, determined by gel chromatographic analysis, and the corresponding non-uniformity coefficients $M_{wGPC(P)}/M_{nGPC(P)}$, as well as the molecular weight determined by vapor pressure osmometry measurements $M_{nOsm(P)}$ of the precursors as well as the molecular weights $M_{nGPC(P)}$ and $M_{wGPC(P)}$, the corresponding non-uniformity coefficients $M_{wGPC(P)}/M_{nGPC(P)}$, the molecular weight determined by vapor pressure osmometry measurements $M_{nOsm(P)}$ and the molecular weight $M_{nAN}$ of the α,ω-polymethacrylate dicarboxylic acids, determined from the acid number assuming a functionality of 2. Finally, the functionalities F of the end products, calculated with the help of $M_{nOsm}$ and the acid number, is shown.

Example 7

Synthesis of an α,ω(Methyl Methacrylate/2-Ethylhexyl Methacrylate Copolymer) Dicarboxylic Acid Basically, the method of Example 1 is followed with the difference that, in addition to methyl methacrylate, 2-ethylhexyl methacrylate is used.

The amounts of monomers used, the ratio of the two monomers and the amounts of chain transfer agent, initiator and xylene are given in Table 1. Furthermore, Table 1 contains the number average and weight average molecular weights $M_{nGPC(P)}$ and $M_{wGPC(P)}$ respectively, determined by gel chromatographic analysis, and the corresponding non-uniformity coefficients $M_{wGPC(P)}/M_{nGPC(P)}$, as well as the molecular weights determined by vapor pressure osmometry measurements $M_{nOsm(P)}$ of the precursors as well as the molecular weights $M_{nGPC(P)}$ and $M_{wGPC(P)}$ and the corresponding non-uniformity coefficients $M_{wGPC(P)}/M_{nGPC(P)}$ of the α,ω-polymethacrylate dicarboxylic acids. Finally, the functionalities F of the end products, calculated with the help of $M_{nOsm}$ and the acid number $M_{nAN}$, is shown.

Examples 1 A to 5 A (Application Examples)

Synthesis and Testing of Epoxide Resins Modified with α,ω-Polymethacrylate Dicarboxylic Acids To synthesize the modified epoxide resins, mixtures of an epoxide resin from bisphenol A and epichlorohydrin, with an epoxide equivalent of 185 g/mole, with varying amounts of α,ω-polymethacrylate dicarboxylic acids are heated at 120° C. for 2 hours after the addition of 0.03% by weight of tetramethyl-ammonium chloride with stirring and passing in nitrogen. After cooling, epoxide resins are obtained, which are liquid at room temperature and the viscosity of which does not deviate significantly from that of the unmodified epoxide resin. The type of α,ω-polymethacrylate dicarboxylic acids used, as well as their proportion in the epoxide resin, are given in Table 2.

Two different polyamine curing agents are used for the curing:

a) a conventional, commercial polyaminoamide, with an H equivalent of 165 and a viscosity of 800 mPas at 75° C.;
b) a conventional, commercial polyaminoimidazoline, with an H equivalent of 95 and a viscosity at 25° C. of 2500 mPas.

The curing agents are added to the modified epoxide resins in equivalent amounts.

The technical application of the epoxide resin/curing agent mixtures was tested by determining the bonding strength (combined tensile and shear strength according to DIN 53 283).

Aluminum sheet of the quality AlCuMg 2pl, 1.6 mm thick, was used for the bonding strength. Before being glued, the sheets were defatted and subjected to a chromate/sulfuric acid pickling process.

The adhesive is applied in an amount of 50 g/m² on the test sheets and cured at room temperature over a period of 3 days. After that, the test pieces are stored for 1 hour at 100° C., in order to complete the curing reaction. The bonding strength, obtained at room temperature, are listed in Table 2. They show that the bonding strength increases appreciably when the epoxide resins, modified pursuant to the invention, are used.

Moreover, the DIN 53 289 floating roller peel strength is determined with the polyaminoamide curing agent A (with an H equivalent of 165) and the epoxide resins, 0.5 mm thick aluminum sheets being peeled from 1.6 mm thick aluminum sheets. The quality of the aluminum sheets, their pretreatment and the curing conditions for the adhesive are unchanged. The peel strengths obtained are given in the last column of Table 2. It can be seen that, even if a polyaminoamide, which imparts a higher flexibility to the epoxide resins, is used as curing agent, an additional increase is obtained in the peel strength values if epoxide resins, modified with α,ω-polymethacrylate dicarboxylic acids are used.

TABLE 1

| | | | | Starting Polymer | | | | End Product | | | | | |
|---|---|---|---|---|---|---|---|---|---|---|---|---|---|
| | acrylate[1] | | | $M_{nGPC}$ | $M_{wGPC}$ | | $M_{nOsm}$ | $M_{nGPC}$ | $M_{wPGC}$ | | $M_{nOsm}$ | $M_{nAN}$[3] | |
| Example No. | Type | Amt. (mole) | Initiator[2] (g) | Xylene Amt. (g) | (g/ mole) | (g/ mole) | $M_w/M_n$ GPC | (g/ mole) | (g/ mole) | (g/ mole) | $M_w/M_n$ GPC | (g/ mole) | (g/ mole) | F |
| 1 | MMA | 8.9 | 3 | 100 | 1070 | 2030 | 1.9 | 1060 | 990 | 1880 | 1.9 | 990 | 961 | 2.06 |
| 2 | BMA | 7.8 | 3 | 100 | 1240 | 2100 | 1.7 | 1280 | 1020 | 1830 | 1.8 | 1130 | 1113 | 2.03 |
| 3 | BMA | 14.5 | 6 | 400 | 2090 | 3880 | 1.8 | 2030 | 1890 | 3200 | 1.7 | 1870 | 1921 | 1.95 |
| 4 | BMA | 22.0 | 9 | 1300 | 3100 | 5900 | 1.9 | 2840 | 3000 | 5700 | 1.9 | 3000 | 3050 | 1.97 |
| 5 | EHMA | 11.0 | 6 | 300 | 2200 | 3500 | 1.6 | 2250 | 1950 | 3300 | 1.7 | 1990 | 1951 | 2.04 |
| 6 | EHMA | 18.0 | 10 | 700 | 3050 | 5800 | 1.9 | 3090 | 2750 | 5200 | 1.9 | 2813 | 2900 | 1.94 |
| 7 | MMA/ EHMA | 8.0/ 8.0 | 7 | 400 | 2280 | 3900 | 1.7 | 2320 | 2100 | 3570 | 1.7 | 2170 | 2100 | 2.07 |

[1]For all examples, 1 mole of methylmercapto acetate is used as chain transfer agent.
[2]Initiator = azodiisobutyronitrile
[3]Assuming a functionality of 2.0

TABLE 2

| Technical application Example No. | Polymethacrylate dicarboxylic acid from Example | | Epoxide resin, parts by weight | Bonding Strength (N/mm$^2$) | | Floating Roller Peel Strength (N/mm) Polyimidazoline |
|---|---|---|---|---|---|---|
| | No. | Parts by weight | | Polyamino amide | Polyimida- zoline | |
| 1A | 2 | 20 | 80 | 27.8 | 29.5 | 4.7 |
| 2A | 3 | 20 | 80 | 27.0 | 29.0 | 3.2 |
| 3A | 5 | 20 | 80 | 28.8 | 30.0 | 4.8 |
| 4A | 5 | 15 | 85 | 27.8 | 28.5 | 3.1 |
| 5A | 6 | 20 | 80 | 27.5 | 29.4 | 3.8 |
| 6A | — | — | 100 | 19.8 | 23.1 | 0.9 |

What is claimed is:

1. α,ω-Polymethacrylate dicarboxylic acids of a general formula

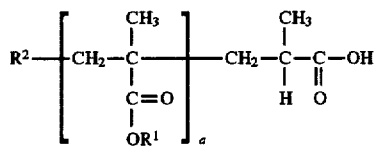

wherein

R$^1$ is an optionally halogenated alkyl group with 1 to 22 carbon atoms, wherein the R$^1$ group may be different within an average acid molecule, R$^2$ is a chain transfer agent having a terminal —COOH group and a has a value not less than 4.

2. The α,ω,-Polymethacrylate dicarboxylic acids of claim 1, wherein the R$^2$ group is (I) a group of a general formula —S—R$^3$COOH, wherein R$^3$ is an optionally branched, divalent alkylene group with 1 to 8 carbon atoms or (II) a group of a general formula

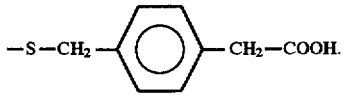

3. A component for synthesizing or modifying a polyepoxide, polyester, polyamide, alkyl resin or a polyurethane, wherein the component comprises the acid of claim 1 or 2.

* * * * *